US010552061B2

(12) United States Patent
Anderson et al.

(10) Patent No.: US 10,552,061 B2
(45) Date of Patent: Feb. 4, 2020

(54) PROVIDING PREFERENTIAL ACCESS TO A METADATA TRACK IN TWO TRACK WRITES (71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Lokesh M. Gupta, Tucson, AZ (US); Jared M. Minch, Tucson, AZ (US); Beth A. Peterson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/671,714

(22) Filed: Aug. 8, 2017

(65) Prior Publication Data
US 2019/0050157 A1 Feb. 14, 2019

(51) Int. Cl.
G06F 3/06 (2006.01)
G06F 12/0871 (2016.01)
G06F 12/128 (2016.01)
G06F 12/122 (2016.01)

(52) U.S. Cl.
CPC ............ *G06F 3/0619* (2013.01); *G06F 3/065* (2013.01); *G06F 3/067* (2013.01); *G06F 12/0871* (2013.01); *G06F 12/128* (2013.01); *G06F 12/122* (2013.01); *G06F 2212/225* (2013.01); *G06F 2212/621* (2013.01)

(58) Field of Classification Search
CPC ........ G06F 3/0619; G06F 3/067; G06F 3/065; G06F 12/0871; G06F 12/128; G06F 12/122; G06F 2212/225; G06F 2212/621; G06F 3/0637
USPC ......................................................... 711/113
See application file for complete search history.

(56) References Cited

U.S. PATENT DOCUMENTS

| 6,425,050 | B1 * | 7/2002 | Beardsley ........... G06F 12/0804 711/113 |
| 6,502,174 | B1 | 12/2002 | Beardsley et al. |
| 6,928,521 | B1 * | 8/2005 | Burton ................ G06F 12/0866 711/114 |
| 7,120,631 | B1 | 10/2006 | Vahalia et al. |
| 8,762,661 | B2 | 6/2014 | Ng et al. |
| 8,825,952 | B2 | 9/2014 | Benhase et al. |
| 8,856,467 | B2 | 10/2014 | Mahar et al. |

(Continued)

*Primary Examiner* — Hiep T Nguyen
(74) *Attorney, Agent, or Firm* — Rabindranath Dutta; Konrad Raynes Davda & Victor LLP (57) ABSTRACT A metadata track stores metadata corresponding to both a first customer data track and a second customer data track. In response to receiving a first request to perform a write on the first customer data track from a two track write process, exclusive access to the first customer data track is provided to the first request, and shared access to the metadata track is provided to the first request. In response to receiving a second request to perform a write on the second customer data track from the two track write process, exclusive access to the second customer data track is provided to the second request, and shared access to the metadata track is provided to the second request prior to providing exclusive access to the metadata track to at least one process that is waiting for exclusive access to the metadata track.

20 Claims, 9 Drawing Sheets (56) References Cited

U.S. PATENT DOCUMENTS

| | | | |
|---|---|---|---|
| 9,170,938 B1* | 10/2015 | Walsh | G06F 12/0246 |
| 2010/0325376 A1* | 12/2010 | Ash | G06F 11/1438 |
| | | | 711/162 |
| 2016/0070741 A1 | 3/2016 | Lin et al. | |
| 2016/0170850 A1* | 6/2016 | Williams | G06F 3/0619 |
| | | | 714/6.23 |

* cited by examiner

PROVIDING PREFERENTIAL ACCESS TO A METADATA TRACK IN TWO TRACK WRITES

BACKGROUND

1. Field

Embodiments relate to a method, system, and computer program product for providing preferential access to a metadata track in two track writes.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include a cache. Data written from a host may be stored in the cache and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device.

A queue is an abstract data type or collection in which the entities in the collection are maintained in order and the operations on the collection are the addition of entities to the rear terminal position, known as enqueue, and removal of entities from the front terminal position, known as dequeue. This makes the queue a First-In-First-Out (FIFO) data structure. In a FIFO data structure, the first element added to the queue is the first one to be removed. This is equivalent to the requirement that once a new element is added to the queue, all elements that were added before the new element have to be removed before the new element can be removed.

A task control block (TCB) is a data structure in the operating system kernel containing the information needed to manage a particular process. TCBs may be generated in a storage controller for performing various operations including those for destages or writes.

SUMMARY OF THE PREFERRED EMBODIMENTS

Provided are a method, system, and computer program product in which a metadata track stores metadata corresponding to both a first customer data track and a second customer data track. In response to receiving a first request to perform a write on the first customer data track from a two track write process, exclusive access to the first customer data track is provided to the first request, and shared access to the metadata track is provided to the first request. In response to receiving a second request to perform a write on the second customer data track from the two track write process, exclusive access to the second customer data track is provided to the second request, and shared access to the metadata track is provided to the second request prior to providing exclusive access to the metadata track to at least one process that is waiting for exclusive access to the metadata track.

In additional embodiments, the write on the first customer data track and the write on the second customer data track are performed subsequent to securing exclusive access to the first customer data track and the second customer data track and shared access to the metadata track by the first request and the second request.

In further embodiments, the at least one process that is waiting for exclusive access on the metadata track is a destage process that needs exclusive access to the metadata track for destaging the metadata track from a cache to a storage device.

In certain embodiments, the metadata track is destaged via the destage process, subsequent to performing the write on the first customer data track and the write on the second customer data track.

In additional embodiments, to perform a two track write, the two track write process writes to both the first customer data track and the second customer data track, or writes to neither of the first customer data track and the second customer data track.

In further embodiments, if a selected track is configured for shared access, then any process requesting exclusive access to the selected track has to wait until all processes having shared access to the selected track release the selected track.

In yet further embodiments, if the selected track is configured for exclusive access for a selected process, then any process requesting shared or exclusive access to the selected track has to wait until the selected track is released by the selected process.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A track in cache may be accessed in either in a shared mode or in an exclusive mode. A plurality of tasks (or processes) may take shared mode access of a track at the same time but only one task can take exclusive mode access of the track. If there are tasks that currently hold shared mode access to a track, then a task that needs exclusive mode access to the track has to wait in a queue, until the tasks that hold shared mode access to the track complete and release access to the track. Similarly, if a task has exclusive mode access to a track then tasks that need shared or exclusive mode access will need to wait for the task that has exclusive mode access to the track to release access to the track.

When a customer data track is written, track access is taken in exclusive mode. Metadata track may need to be read or updated as a result of the customer data track being written. Since customer data track access is taken in exclusive mode, it is ensured that portion of the metadata corresponding to that customer track will not be modified by another task. Therefore, metadata access is taken in shared mode. In such embodiments, customer data tracks may be written in parallel and still share the same metadata track. However, when a metadata track needs to be destaged, then access to the metadata track has to be taken in an exclusive mode because no other task should be modifying the metadata track while it is being destaged.

In one mechanism for metadata track access, if a task requests an access to a metadata track and the access cannot be granted immediately then the request is queued in a FIFO queue to ensure fairness. For example, if there are tasks that currently hold shared access then request from a task for exclusive access has to wait in a queue for shared access tasks to complete and release access to the metadata track. Similarly, if a task has exclusive access then requests from tasks for shared or exclusive access will need to wait for the exclusive access task to release access to the metadata track.

However, when a metadata track needs to be destaged, then access to the metadata track has to be taken in an exclusive mode because no other task should be modifying the metadata track while it is being destaged.

In two track writes, a host takes track accesses on both tracks before performing the writes, to ensure that both tracks are either written or not written. For example, in a two track write, a TCB A needs to take exclusive mode access on customer data track Y and shared mode access on metadata track X, and TCB B needs to take exclusive mode access on customer track Z and shared mode access on metadata track X. However, if a destage process requests exclusive mode access on the metadata track X, prior to the request from TCB B for shared mode access to the metadata track X, then TCB B may not secure shared access to the metadata track X, because the destage process is already waiting in the FIFO queue for exclusive access to the metadata track X. To avoid such a situation, in certain embodiments, TCB A will not release access to the metadata track X until TCB B secures access to the metadata track X. In such embodiments, the shared access mode request for metadata track X from TCB B is granted shared access to the metadata track X, even if the destage process is waiting for exclusive access to the metadata track X.

Certain embodiments allow two track writes on a cache. A host takes exclusive access on two customer data tracks and shared access on the metadata track that includes metadata of the two customer data tracks, before performing the writes on the two customer data tracks, ensuring that both customer data tracks are either written or not written. Processes that require exclusive access on the metadata track are made to wait while a two track write that has shared access on the metadata track is in progress.

Exemplary Embodiments

Figure 1:
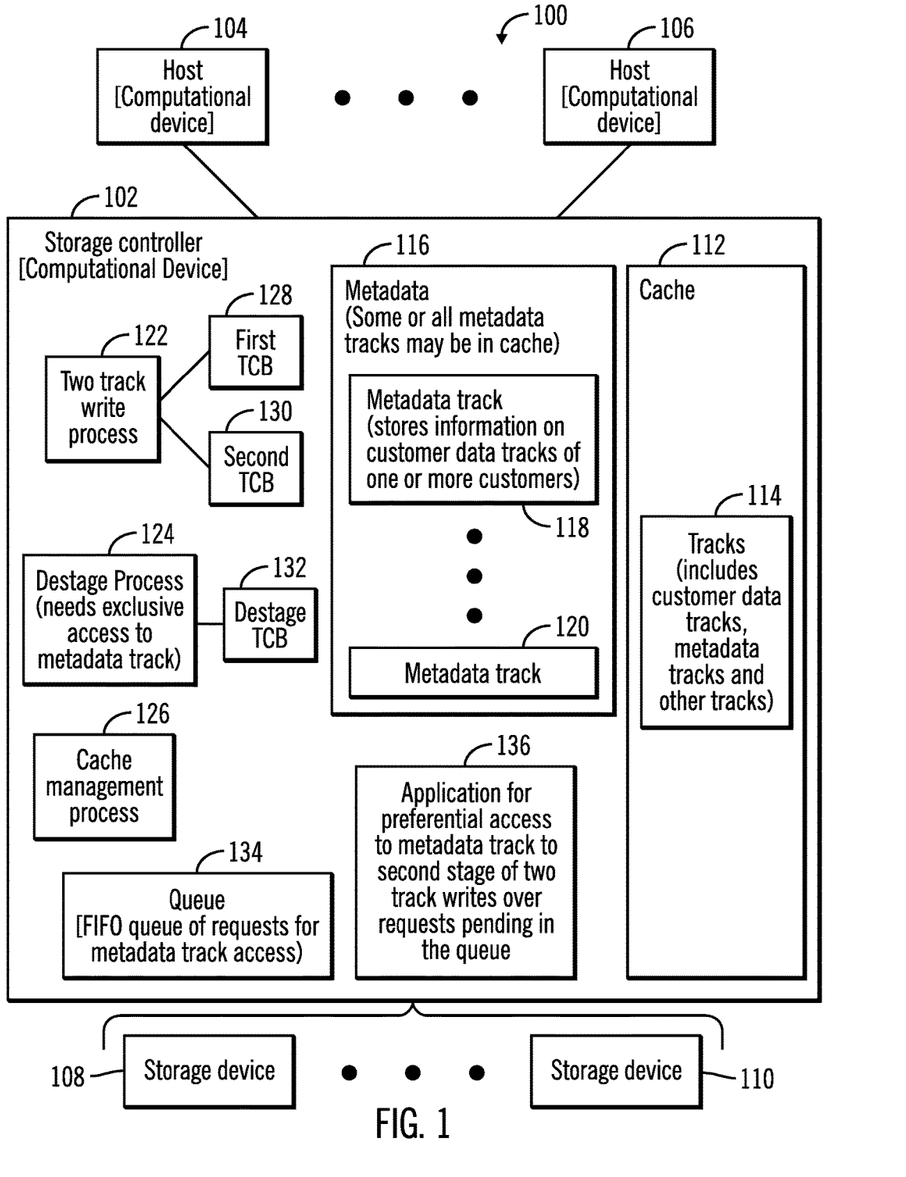
FIG. 1 illustrates a block diagram of a computing environment comprising a storage controller coupled to one or more hosts and one or more storage devices for performing two track writes, in accordance with certain embodiments.

FIG. 1 illustrates a block diagram of a computing environment 100 comprising a storage controller 102 coupled to one or more hosts 104, 106, and one or more storage devices 108, 110, in accordance with certain embodiments. The storage controller 102 allows the plurality of hosts 104, 106 to perform input/output (I/O) operations with logical storage maintained by the storage controller 102. The physical storage corresponding to the logical storage may be found in one or more of the storage devices 108, 110 and/or a cache 112 (e.g., a memory) of the storage controller 102.

The storage controller 102 and the hosts 104, 106 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102, the hosts 104, 106, and the storage devices 108, 110 may be elements in any suitable network, such as, a storage area network, a wide area network, the Internet, an intranet. In certain embodiments, the storage controller 102, the hosts 104, 106, and the storage devices 108, 110 may be elements in a cloud computing environment that comprises the computing environment 100. The storage devices 108, 110 may be comprised of storage disks, tape drives, solid state storage, etc., and may be controlled by the storage controller 102.

The cache 112 may store a plurality of tracks 114 that include customer data tracks, metadata tracks, and other tracks. Each of the metadata tracks may store information on one or more customer data track. Therefore, metadata 116 for a plurality of customer data tracks is stored in a plurality of metadata tracks 118, 120 where each metadata track stores information on customer data tracks of one or more customers and some or all of the metadata tracks 118, 120 may be present in the cache 112.

The storage controller 102 executes a two track write process 122, a destage process 124 that may execute as a background process, and a cache management process 126. The two track write process 122 may need to perform writes on each track of two customer tracks or on neither track of the two customer data tracks and writes are performed by a first TCB 128 and a second TCB 130. The destage process 124 may need exclusive access to metadata tracks that are to be destaged from the cache 112 to the storage devices 108, 110, and a destage TCB 132 may perform the destages. The cache management process 126 may perform various management operations related to the cache 112, the tracks of the cache 114, and the metadata 116 including the metadata tracks 118, 120.

A queue 134 (e.g. a FIFO queue) is maintained for requests that are waiting for access to a metadata track. In certain embodiments, a mechanism 136 (e.g., an application)

implemented in software, firmware, hardware or any combination thereof, provides preferential access to a metadata track to access requests from the second TCB 130 of the two track write process 122, even if there are access requests for the metadata track from other TCBs waiting in the queue 134. For example, an access request for the metadata track 120 from the second TCB 130 of the two track write process 122 is provided even if a request from the destage TCB 132 for access to the metadata track 120 is waiting in the queue 134.

Figure 2:
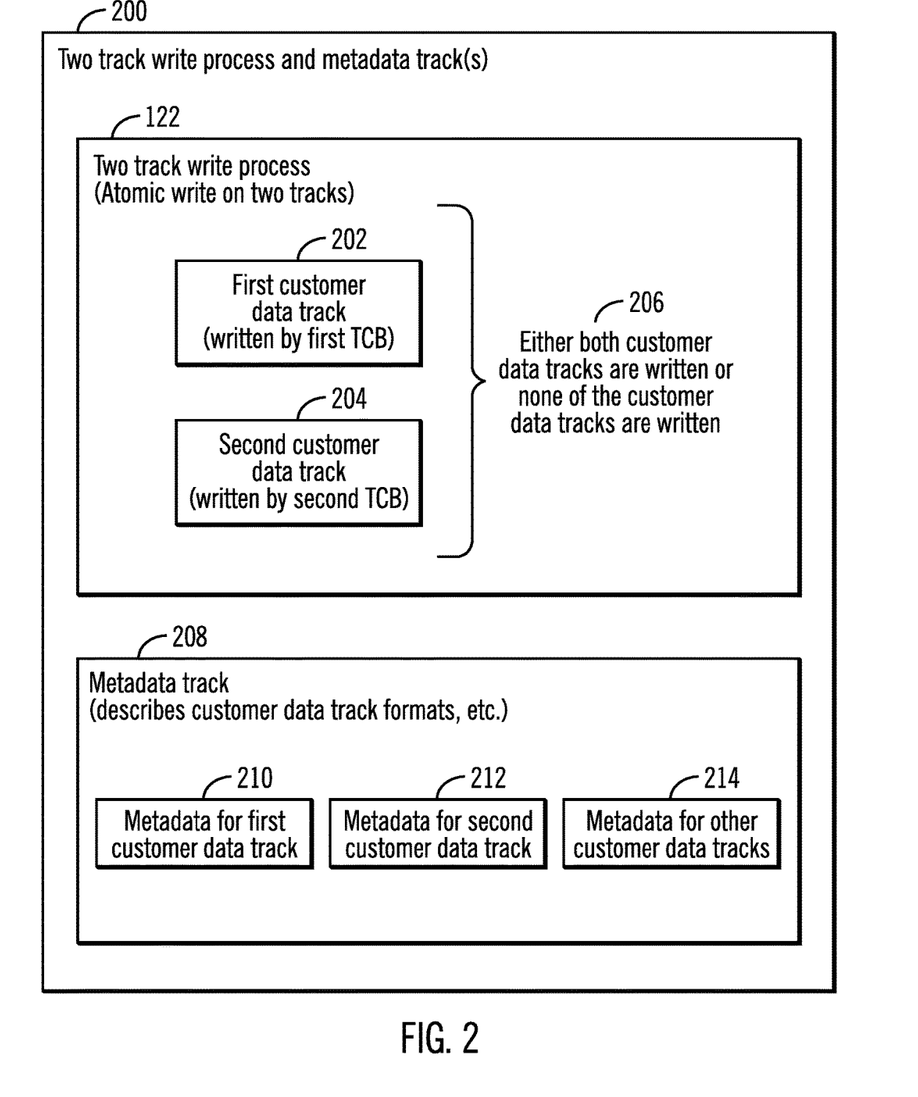
FIG. 2 illustrates a block diagram that shows how two track writes are performed, in accordance with certain embodiments.

FIG. 2 illustrates a block diagram 200 that shows how two track writes are performed, in accordance with certain embodiments.

A two track write process 122 may perform a first write to the first customer data track 202 via the first TCB 128, and a second write to the second customer data track 204 via the second TCB 130. The two track write process 122 either writes to both the first customer data track 202 and the second customer data track 204, or writes to neither of the first customer data track 202 and the second customer data track 204 (as shown via reference numeral 206). The two track write process 122 may therefore perform an atomic write to the first customer data track 202 and the second customer data track 204.

The metadata track 208 stores a description of formats of a plurality of customer data tracks so that data may be expeditiously accessed in the plurality customer data tracks. A single metadata track may store metadata for over 1000 customer data tracks. For example, in FIG. 2, the metadata track 208 stores metadata 210 for the first customer data track 202, metadata 212 of the second customer data track 204, and metadata 214 for other customer data tracks.

Figure 3:
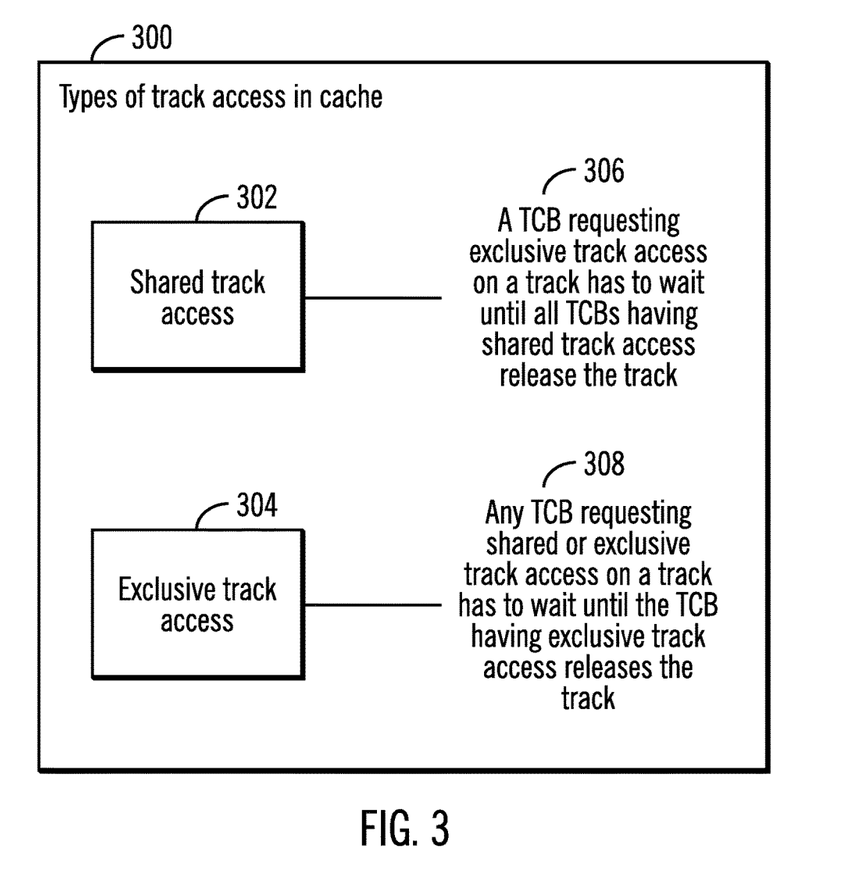
FIG. 3 illustrates a block diagram that shows types of track access in cache, in accordance with certain embodiments.

FIG. 3 illustrates a block diagram 300 that shows different types of track access in the cache 112, in accordance with certain embodiments.

There are two types of track access in the cache 112. A first type of track access is shared track access 302, and a second type of track access is exclusive track access 304.

Processes that request shared track access 302 may access the track at the same time with other processes that request the shared track access 302. Processes that need access to a track exclusively may request an exclusive track access 304.

If there are shared accesses on the track when an exclusive access is requested by a TCB, then the request for the exclusive access has to wait for all TCBs with shared accesses to release the track before exclusive access can be granted (as shown via reference numeral 306). Similarly, a shared or exclusive access request from a TCB for a track which is under exclusive access via another TCB has to wait for the exclusive access to be released before the shared or exclusive access can be granted (as shown via reference numeral 308).

Figure 4:
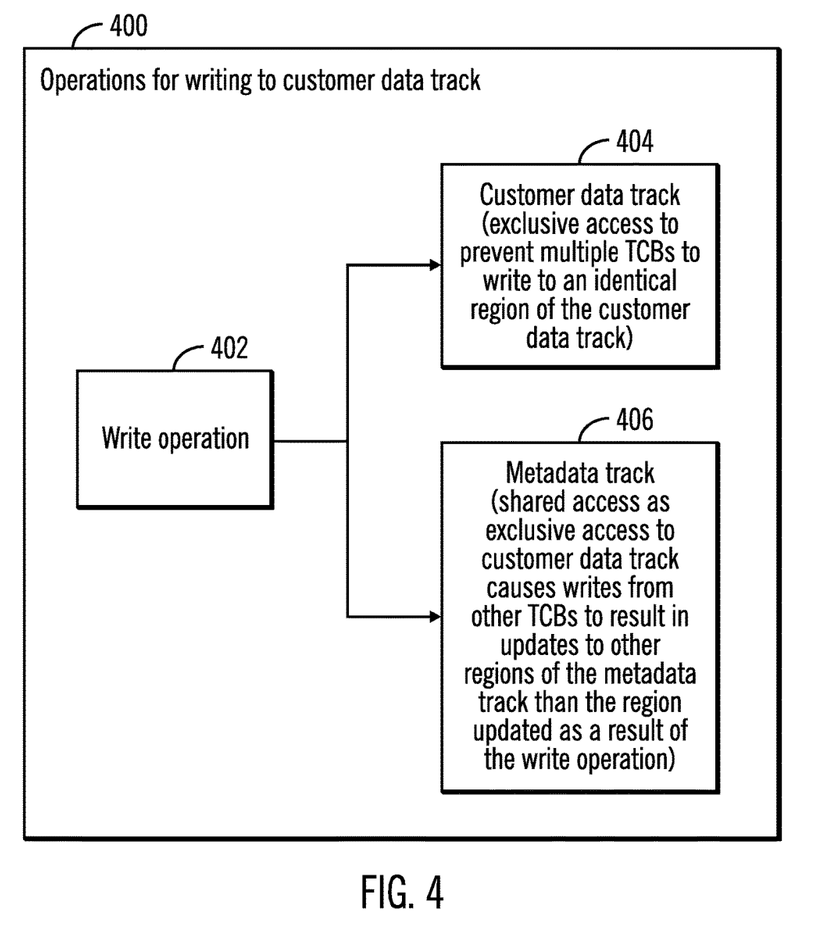
FIG. 4 illustrates a block diagram that shows operations for writing to a customer data track, in accordance with certain embodiments.

FIG. 4 illustrates a block diagram 400 that shows operations for writing customer data via a host 104, in accordance with certain embodiments.

During an "write" operation 402, a TCB (e.g., first TCB 128 or second TCB 130) of the two track write process 122 takes exclusive access to a customer data track (reference numeral 404) to prevent multiple TCBs to write to an identical region of the customer data track. However, the TCB secures shared access to the metadata track (reference numeral 406) because exclusive access on the customer data track causes writes from other TCBs to result in updates to other regions of the metadata track than the region updated as a result of the write operation from the TCB.

Therefore, the writing of customer data via the host 104, 106 through the storage controller 102 does not takes exclusive access on metadata tracks. The cache 112 relies on exclusive access on customer data tracks to ensure that metadata for a customer data track may be updated by a single client at a time. This allows for increased parallelism, and a plurality of customer data tracks may be written to in parallel.

Internal operations like destage on a metadata track needs to take track access in exclusive mode. A track in cache 112 should not be updated while it is being destaged otherwise the least recently used (LRU) count may be erroneous on the track since the LRU count is computed when the track is modified via the updating.

An error may occur in a two track write if the destage process 124 takes exclusive access of a metadata track before the second TCB 130 of the two track write process 122 takes shared access to the metadata track to complete the second of the two writes of the two track write.

Figure 5:
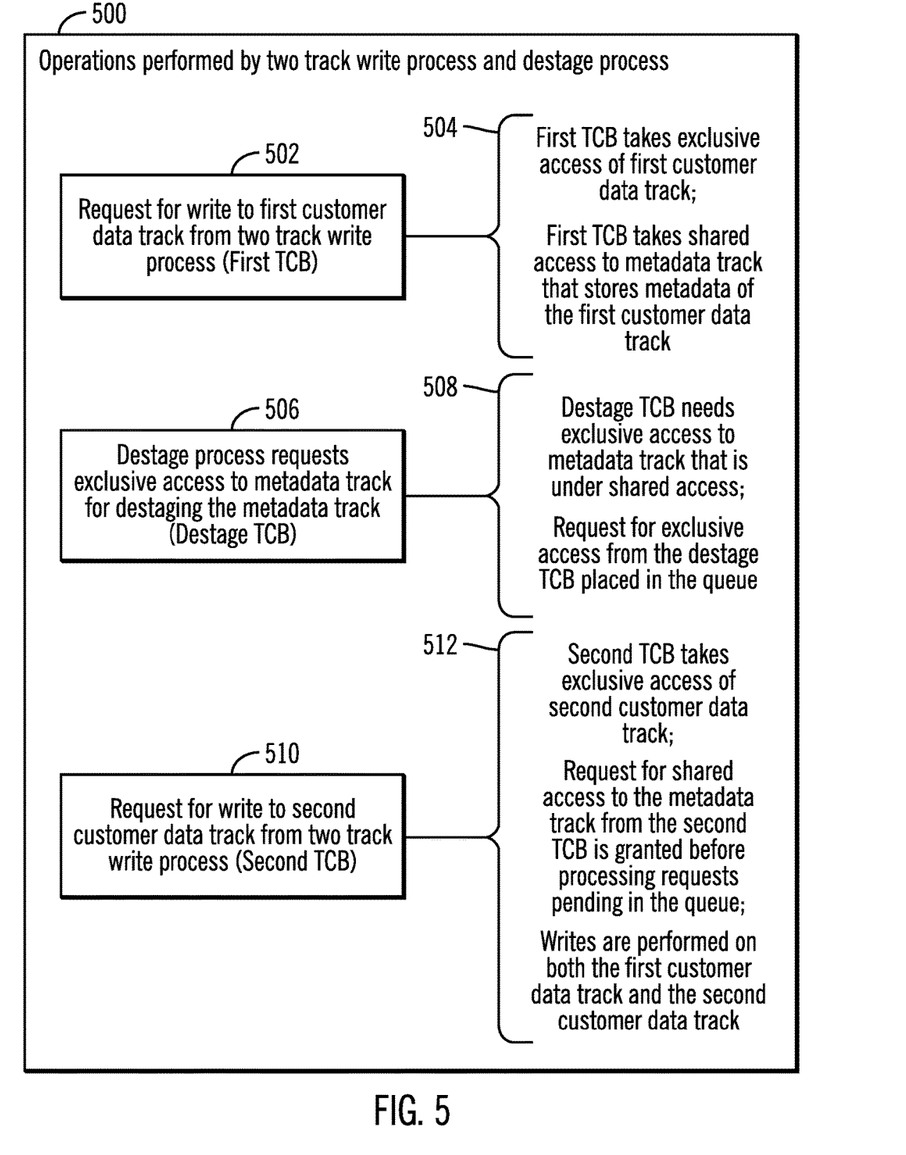
FIG. 5 illustrates a flowchart that shows operations performed by a two track write process and a destage process, in accordance with certain embodiments.

FIG. 5 illustrates a flowchart 500 that shows operations performed by a two track write process 122 and a destage process 124, in accordance with certain embodiments. The operations shown in FIG. 5 may be performed via processes that execute in the storage controller 102.

Control starts at block 502 in which the first TCB 128 of the two track write process 122 generates a request for a write to the first customer data track 202. In response (shown via reference numeral 504), the first TCB 128 takes exclusive access of first customer data track 202, and the first TCB 128 takes shared access to the metadata track 208 that stores metadata of the first customer data track.

From block 502 control proceeds to block 506 in which the destage TCB 132 corresponding to the destage process 124 requests exclusive access to the metadata track 208 for destaging the metadata track 208. The destage TCB 132 needs exclusive access to the metadata track 208 that is under shared access, and as a result the request for exclusive access to the metadata track 208 from the destage TCB 132 is placed in the queue 134 (as shown via reference numeral 508).

From block 506 control proceeds to block 510 in which the second TCB 130 of the two track write process 122 generates a request for a write to the second customer data track 204. In response (shown via reference numeral 512), the second TCB 130 takes exclusive access of the second customer data track 204. The request for shared access to the metadata track 208 from the second TCB 130 is granted before processing requests pending in the queue 134. Writes are performed on both the first customer data track 202 and the second customer data track 204, while the request for exclusive access on the metadata track 208 from the destage TCB 132 is waiting in the queue 134.

As a result, two track writes to both the first and the second customer data tracks are completed prior to the destage process 124 starting a destage of the metadata track that includes metadata of the first and second customer data tracks.

Figure 6:
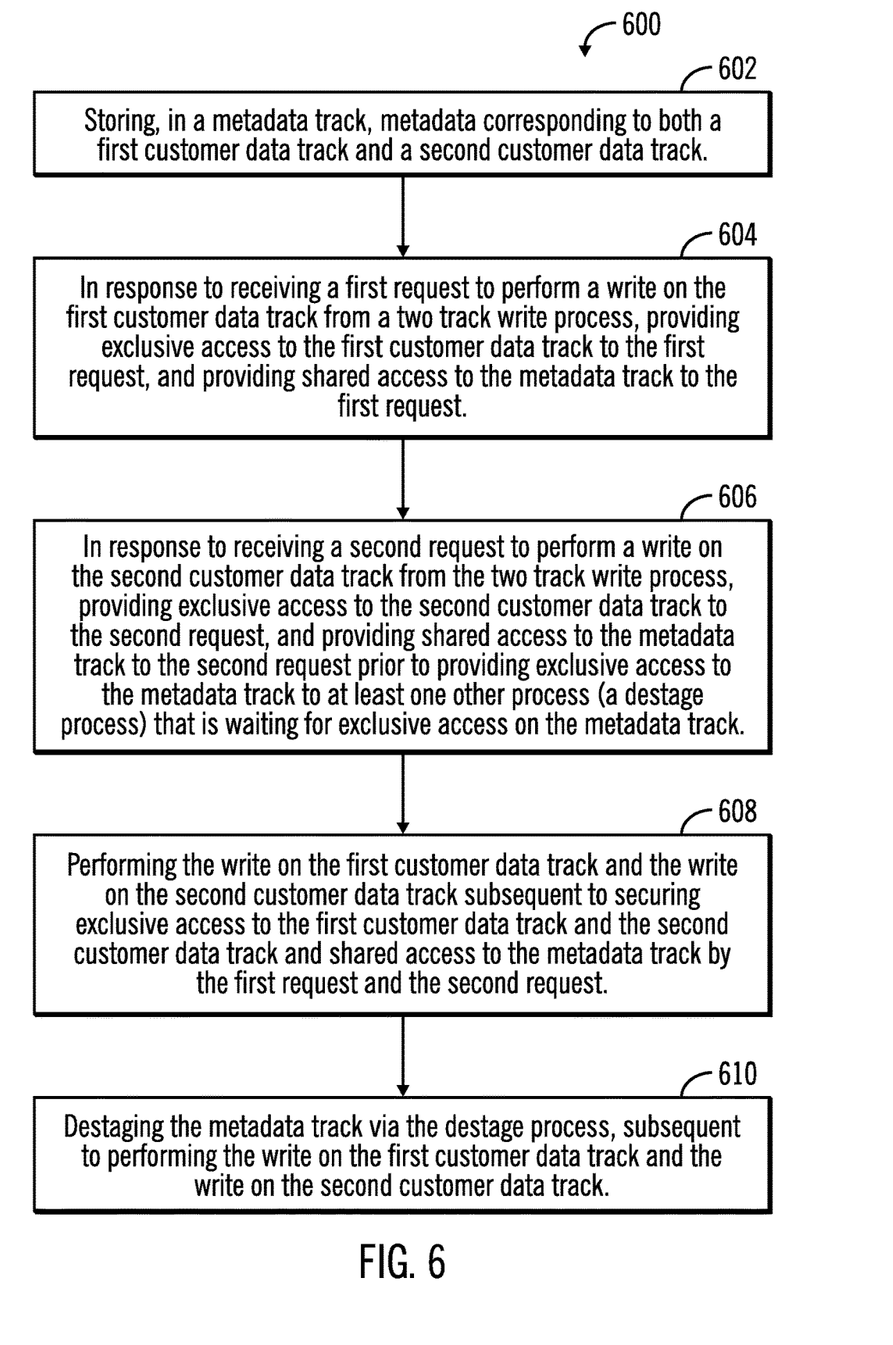
FIG. 6 illustrates a flowchart that shows operations for providing preferential access to a metadata track in two track writes, in accordance with certain embodiments.

FIG. 6 illustrates a flowchart 600 that shows operations for providing preferential access to a metadata track in two track writes, in accordance with certain embodiments. The operations shown in FIG. 6 may be performed via processes that execute in the storage controller 102.

Control starts in block 602 in which a metadata track 208 stores metadata corresponding to both a first customer data track 202 and a second customer data track 204. In response to receiving a first request (e.g., via first TCB 128) to perform a write on the first customer data track 202 from a two track write process 122, exclusive access to the first customer data track 202 is provided to the first request, and shared access to the metadata track 208 is provided to the first request (at block 604).

From block 604 control proceeds to block 606, in which in response to receiving a second request (e.g. via second TCB 130) to perform a write on the second customer data track 204 from the two track write process 122, exclusive access to the second customer data track 204 is provided to the second request, and shared access to the metadata track 208 is provided to the second request prior to providing exclusive access to the metadata track 208 to at least one process (e.g., destage process 124) that is waiting for exclusive access to the metadata track 208.

From block 606 control proceeds to block 608 and the write on the first customer data track 202 and the write on the second customer data track 204 are performed subsequent to securing exclusive access to the first customer data track 202 and the second customer data track 204 and shared access to the metadata track 208 by the first request and the second request. The metadata track 208 is destaged via the destage process 124, subsequent to performing the write on the first customer data track 202 and the write on the second customer data track 204 (at block 610).

Therefore, FIG. 1-6 illustrate certain embodiments in which a storage controller is configured to allow a two track write process on a first and a second customer data tracks to complete prior to destaging the metadata track that stores the metadata of the first and second customer data tracks, even if the request for the destaging arrives in between the requests for writing to the first customer data track and the second customer data track.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
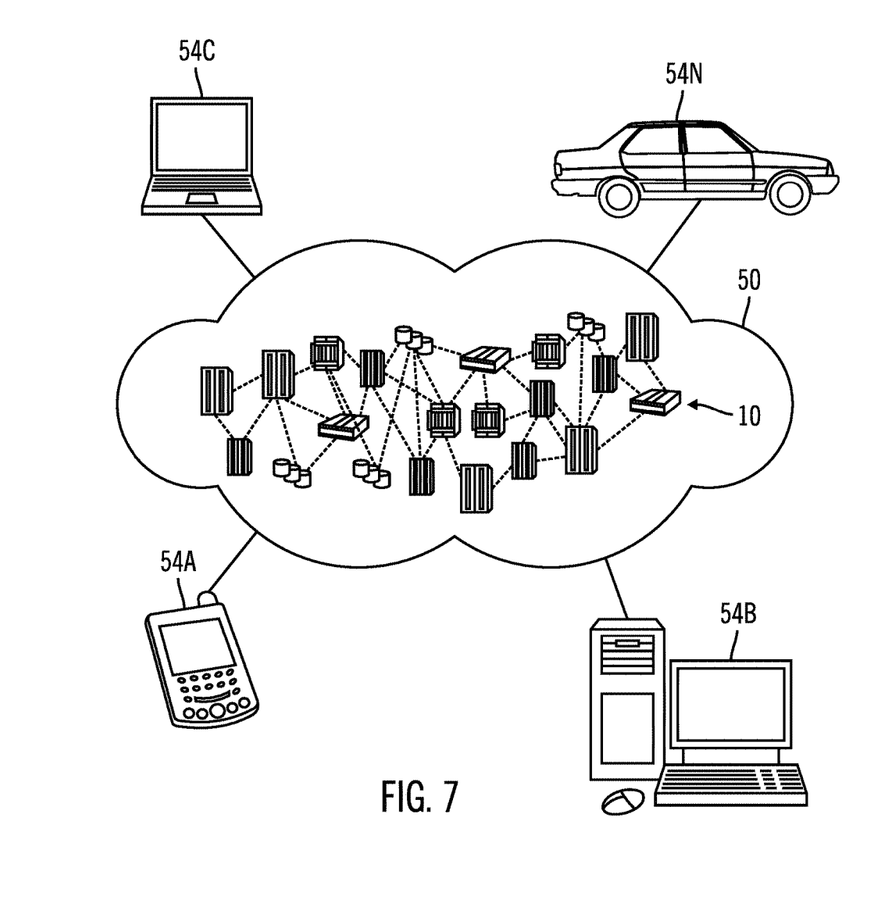
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
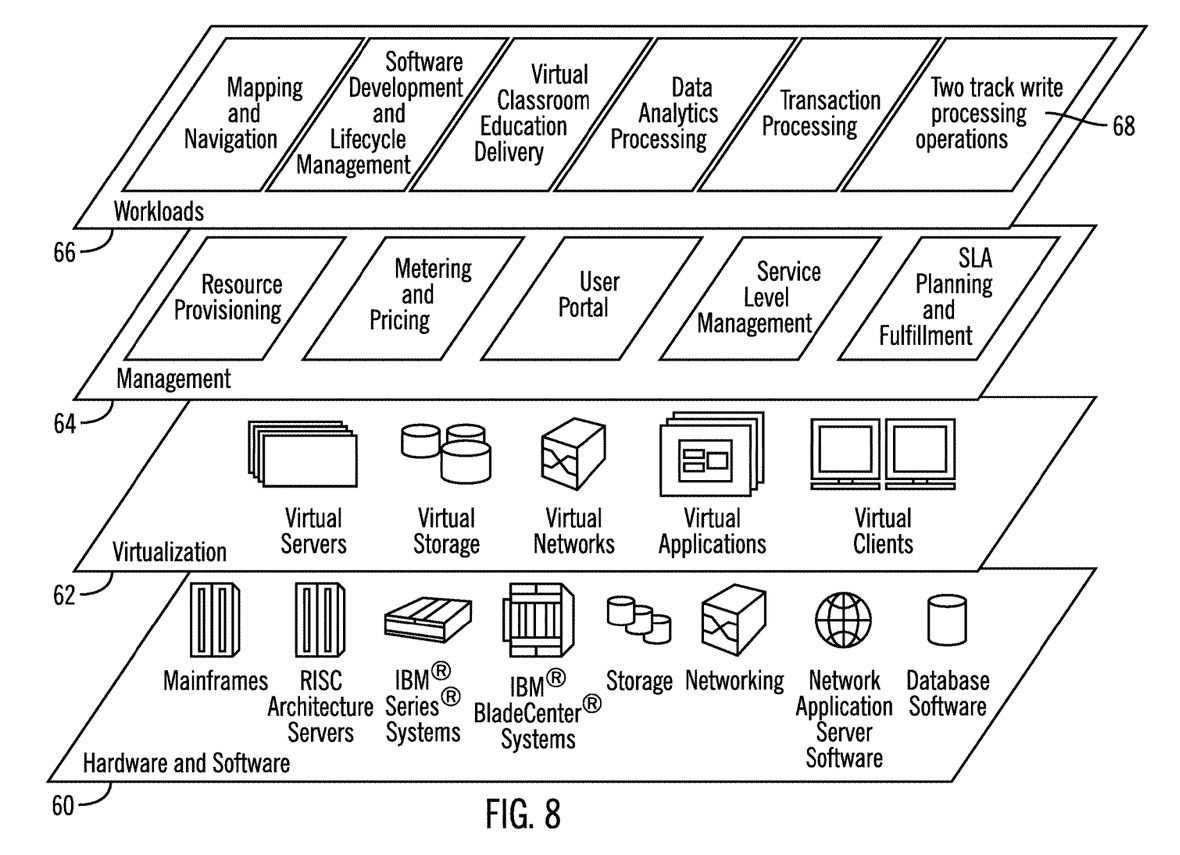
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and two track write processing operations 68 as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
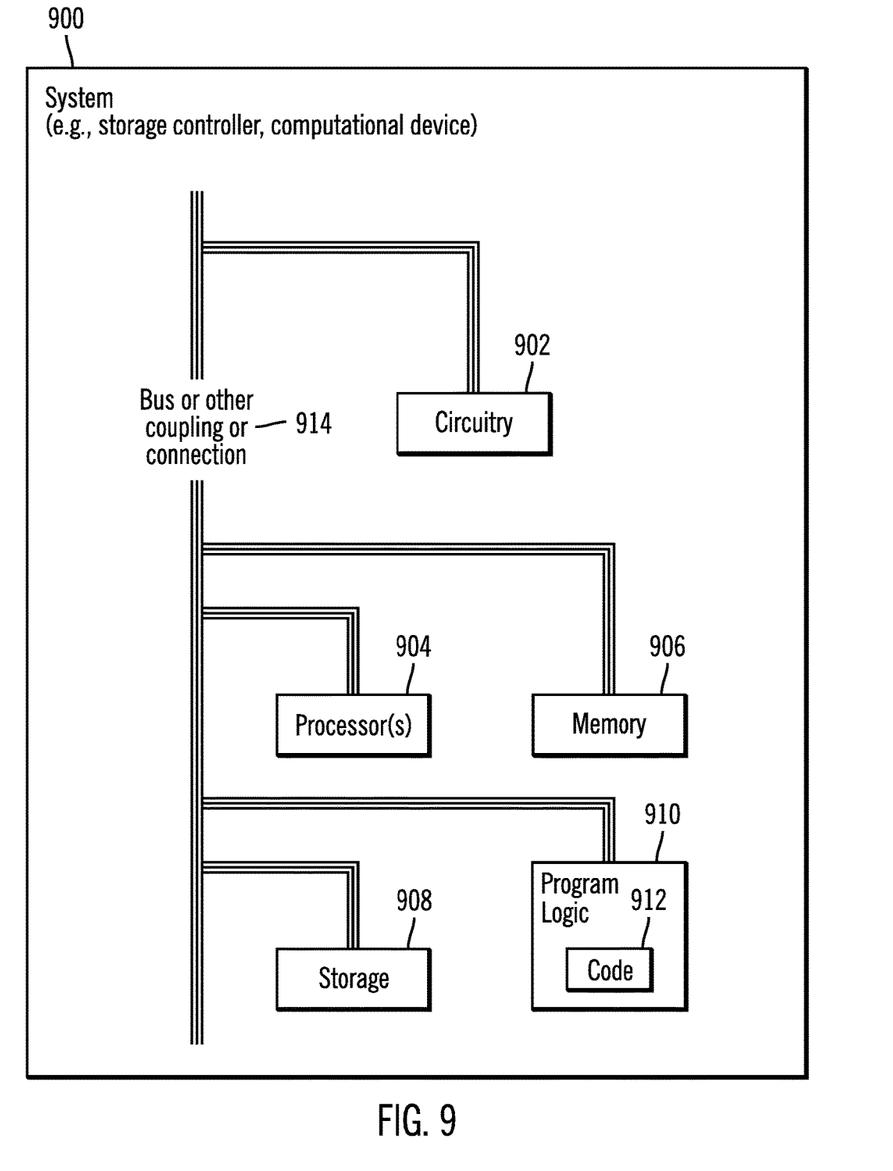
FIG. 9 illustrates a block diagram of a computational system that shows certain elements that may be included in the storage controller or the host, as described in FIGS. 1-8, in accordance with certain embodiments.

FIG. 9 illustrates a block diagram that shows certain elements that may be included in the storage controller 102, the hosts 104, 106, or other computational devices in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   storing, by a cache management process, in a metadata track, metadata corresponding to both a first customer data track and a second customer data track, wherein the first customer data track, the second customer data track and the metadata track are stored in a cache;
   in response to receiving, by the cache management process, a first request to perform a write on the first customer data track from a two track write process, providing, by the cache management process, exclusive access to the first customer data track to the first request, and providing, by the cache management process, shared access to the metadata track to the first request; and
   in response to receiving, by the cache management process, a second request to perform a write on the second customer data track from the two track write process, providing, by the cache management process, exclusive access to the second customer data track to the second request, and providing, by the cache management process, shared access to the metadata track to the second request prior to providing, by the cache management process, exclusive access to the metadata track to a destage process that is waiting for exclusive access to the metadata track, wherein the destage process is waiting for exclusive access to the metadata track prior to the receiving by the cache management process of the second request from the two track write process.

2. The method of claim 1, the method further comprising:
   performing the write on the first customer data track and the write on the second customer data track subsequent to securing exclusive access to the first customer data track and the second customer data track and shared access to the metadata track by the first request and the second request.

3. The method of claim 2, wherein the destage process needs exclusive access to the metadata track for destaging the metadata track from the cache to a storage device.

4. The method of claim 3, the method further comprising:
   destaging the metadata track via the destage process, subsequent to performing the write on the first customer data track and the write on the second customer data track.

5. The method of claim 1, wherein to perform a two track write, the two track write process writes to both the first customer data track and the second customer data track, or writes to neither of the first customer data track and the second customer data track.

6. The method of claim 1, wherein if a selected track is configured for shared access, then any process requesting exclusive access to the selected track has to wait until all processes having shared access to the selected track release the selected track.

7. The method of claim 6, wherein if the selected track is configured for exclusive access for a selected process, then any process requesting shared or exclusive access to the selected track has to wait until the selected track is released by the selected process.

8. A system, comprising:
a memory; and
a processor coupled to the memory, wherein the processor performs operations, the operations comprising:
storing, by a cache management process, in a metadata track, metadata corresponding to both a first customer data track and a second customer data track, wherein the first customer data track, the second customer data track and the metadata track are stored in a cache;
in response to receiving, by the cache management process, a first request to perform a write on the first customer data track from a two track write process, providing, by the cache management process, exclusive access to the first customer data track to the first request, and providing, by the cache management process, shared access to the metadata track to the first request; and
in response to receiving, by the cache management process, a second request to perform a write on the second customer data track from the two track write process, providing, by the cache management process, exclusive access to the second customer data track to the second request, and providing, by the cache management process, shared access to the metadata track to the second request prior to providing, by the cache management process, exclusive access to the metadata track to a destage process that is waiting for exclusive access to the metadata track, wherein the destage process is waiting for exclusive access to the metadata track prior to the receiving by the cache management process of the second request from the two track write process.

9. The system of claim 8, the operations further comprising:
performing the write on the first customer data track and the write on the second customer data track subsequent to securing exclusive access to the first customer data track and the second customer data track and shared access to the metadata track by the first request and the second request.

10. The system of claim 9, wherein the destage process needs exclusive access to the metadata track for destaging the metadata track from the cache to a storage device.

11. The system of claim 10, the operations further comprising:
destaging the metadata track via the destage process, subsequent to performing the write on the first customer data track and the write on the second customer data track.

12. The system of claim 8, wherein to perform a two track write, the two track write process writes to both the first customer data track and the second customer data track, or writes to neither of the first customer data track and the second customer data track.

13. The system of claim 8, wherein if a selected track is configured for shared access, then any process requesting exclusive access to the selected track has to wait until all processes having shared access to the selected track release the selected track.

14. The system of claim 13, wherein if the selected track is configured for exclusive access for a selected process, then any process requesting shared or exclusive access to the selected track has to wait until the selected track is released by the selected process.

15. A computer program product, the computer program product comprising a computer readable storage medium having computer readable program code embodied therewith, the computer readable program code configured to perform operations, the operations comprising:
storing, by a cache management process, in a metadata track, metadata corresponding to both a first customer data track and a second customer data track, wherein the first customer data track, the second customer data track and the metadata track are stored in a cache;
in response to receiving, by the cache management process, a first request to perform a write on the first customer data track from a two track write process, providing, by the cache management process, exclusive access to the first customer data track to the first request, and providing, by the cache management process, shared access to the metadata track to the first request; and
in response to receiving, by the cache management process, a second request to perform a write on the second customer data track from the two track write process, providing, by the cache management process, exclusive access to the second customer data track to the second request, and providing, by the cache management process, shared access to the metadata track to the second request prior to providing, by the cache management process, exclusive access to the metadata track to a destage process that is waiting for exclusive access to the metadata track, wherein the destage process is waiting for exclusive access to the metadata track prior to the receiving by the cache management process of the second request from the two track write process.

16. The computer program product of claim 15, the operations further comprising:
performing the write on the first customer data track and the write on the second customer data track subsequent to securing exclusive access to the first customer data track and the second customer data track and shared access to the metadata track by the first request and the second request.

17. The computer program product of claim 16, wherein the destage process needs exclusive access to the metadata track for destaging the metadata track from the cache to a storage device.

18. The computer program product of claim 17, the operations further comprising:
destaging the metadata track via the destage process, subsequent to performing the write on the first customer data track and the write on the second customer data track.

19. The computer program product of claim 15, wherein to perform a two track write, the two track write process writes to both the first customer data track and the second customer data track, or writes to neither of the first customer data track and the second customer data track.

20. The computer program product of claim 15, wherein if a selected track is configured for shared access, then any process requesting exclusive access to the selected track has to wait until all processes having shared access to the selected track release the selected track, and wherein if the selected track is configured for exclusive access for a selected process, then any process requesting shared or exclusive access to the selected track has to wait until the selected track is released by the selected process.

* * * * *